(12) United States Patent
Chen

(10) Patent No.: US 9,657,792 B2
(45) Date of Patent: May 23, 2017

(54) WHEEL CYLINDER ADJUSTER

(71) Applicant: Shu-Hui Chen, Taichung (TW)

(72) Inventor: Shu-Hui Chen, Taichung (TW)

( * ) Notice: Subject to any disclaimer, the term of this patent is extended or adjusted under 35 U.S.C. 154(b) by 10 days.

(21) Appl. No.: 14/803,134

(22) Filed: Jul. 20, 2015

(65) Prior Publication Data

US 2017/0023076 A1   Jan. 26, 2017

(51) Int. Cl.
*B25B 27/00*   (2006.01)
*B25B 27/02*   (2006.01)
*F16D 65/00*   (2006.01)

(52) U.S. Cl.
CPC ...... *F16D 65/0043* (2013.01); *B25B 27/0035* (2013.01); *B25B 27/023* (2013.01)

(58) Field of Classification Search
CPC . B25B 27/0035; B25B 27/023; B25B 27/062; B25B 27/0021; F16D 65/0043
See application file for complete search history.

(56) References Cited

U.S. PATENT DOCUMENTS

| | | | | |
|---|---|---|---|---|
| 3,786,551 A * | 1/1974 | Gregg | ............ | B25B 27/02 254/100 |
| 6,095,017 A * | 8/2000 | Long | ............ | B25B 27/0035 81/176.15 |
| 6,574,846 B1 * | 6/2003 | Kang | ............ | B25B 27/0021 29/239 |
| 6,678,931 B1 * | 1/2004 | Tatasciore | ............ | B25B 27/0035 29/239 |
| 7,194,948 B2 * | 3/2007 | Liu | ............ | F15B 15/202 29/239 |
| 7,748,095 B1 * | 7/2010 | Phane | ............ | B25B 27/0035 269/6 |
| 8,661,638 B2 * | 3/2014 | Chen | ............ | B25B 27/0035 29/239 |
| 9,174,330 B2 * | 11/2015 | Chen | ............ | B25B 27/0035 |
| 2005/0000073 A1 * | 1/2005 | Ploeger | ............ | B25B 27/0035 29/239 |
| 2010/0212924 A1 * | 8/2010 | Liu | ............ | F16D 65/0043 173/218 |
| 2011/0010906 A1 * | 1/2011 | Mitchell | ............ | B25B 27/0035 29/239 |
| 2012/0216380 A1 * | 8/2012 | Chen | ............ | B25B 27/0021 29/267 |

* cited by examiner

*Primary Examiner* — Larry E Waggle, Jr.
*Assistant Examiner* — Seahee Yoon

(57) ABSTRACT

A caliper piston adjuster includes a body defining a passage, a push rod, a resilient member, a holding rod, a positioning stop plate, and a positioning member. The push rod is fixedly connected with a positioning cart, and mounted with the resilient member, and inserted through the passage of the body, such that one end of the resilient member contacts the positioning part fixed at the push rod. The push rod is connected with a connector and an activating disc respectively at two ends thereof. The connector is connected with the holding rod. The positioning member is inserted through an opening of the positioning stop plate to be connected to the body. With the aid of the resilient member, the caliper piston adjuster can adjust the piston of a caliper cylinder more easily by rotating the holding rod.

6 Claims, 7 Drawing Sheets

WHEEL CYLINDER ADJUSTER

BACKGROUND OF THE INVENTION

1. Fields of the Invention

The present invention relates to a caliper piston adjuster for adjusting the piston of a caliper cylinder, and more particularly, to a caliper piston adjuster without using a threaded rod.

2. Descriptions of Related Art

For a vehicle having been used for a period of time, due to the wearing of the lining pads attached to the caliper cylinders, the pistons of the caliper cylinders would project toward the corresponding brake discs. When replacing the lining pads, the caliper pistons have to be moved back to their original positions. A conventional caliper cylinder adjuster 1, which is disclosed in FIG. 1 for adjusting the pistons of caliper valves, generally comprises a threaded rod 10 which has one end connected with a holding rod 11, and the other end of the threaded rod 10 has an activating disc 12 connected thereto. A nut 13 and a positioning stop plate 14 are respectively mounted to the threaded rod 10. The activating disc 12 is urged against the piston 20 of a caliper cylinder 2, and the positioning stop plate 14 is urged against the caliper body 21. When the threaded rod 10 is rotated by operating the holding rod 11, the piston 20 is pushed back to its original position. However, after the piston 20 is pushed back to its original position by rotating the threaded rod 10 and the activating disc 12, the activating disc 12 has to be moved backward by rotating the threaded rod 10 in an opposite direction. It takes a lot of time to rotate the threaded rod 10 in the opposite direction.

The present invention intends to provide a caliper cylinder adjuster that does not require a threaded rod to eliminate the shortcomings mentioned above.

SUMMARY OF THE INVENTION

The present invention relates to a caliper piston adjuster and comprises a body having a first end and a second end and defining a passage therethrough. A push rod is provided with a polygonal positioning protrusion at a first end thereof, and is fixedly connected with a positioning part, and is mounted with a resilient member, and is inserted through the passage of the body, such that one end of the resilient member contacts the positioning part fixed at the push rod. A positioning ball is connected to one side of the positioning protrusion. A connector is connected to a second end of the push rod and has a through hole defined transversely therethrough. A holding rod is inserted through the through hole of the connector. A positioning member is connected to the first end of the body and has a tubular portion. An axial hole is defined in the positioning member. The first end of the push rod is inserted through the axial hole to be fixedly connected with an activating disc. The positioning member has a flange.

Preferably, female threads are defined at the inner periphery of the second end of the body. The tubular portion of the positioning member has male threads which are threadedly engaged with the female threads of the first end of the body.

Preferably, the push rod defines a recess and two opposite first pin holes at its second end, wherein the first pin holes are substantially at a right angle to the recess and communicate with the recess. The connector has an extension. The extension is inserted into the recess of the push rod and defines a second pin hole which can be aligned with the first pin holes of the push rod. A pin extends is inserted through the first and second pin holes, so that the connector is fixedly connected to the push rod.

Preferably, the push rod has a positioning hole defined transversely therethrough, between its first and second ends. The positioning part on the push rod is a collar which has two opposite third pin holes. Another pin is inserted through the third pin holes and the positioning hole.

Preferably, the caliper piston adjuster further comprises a positioning stop plate defining an opening and mounted to the body via the opening.

Preferably, the activating disc defines a polygonal insert hole and has at least two studs on one side thereof, wherein the positioning protrusion of the push rod is inserted into the polygonal insert hole of the activating disc so that the activating disc is fixedly connected to the push rod.

The advantage of the present invention is that the piston of a caliper cylinder used in a brake system of a vehicle can be adjusted easily by rotating the holding rod and the push rod, with the aid of the resilient member, and no threaded rod is needed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
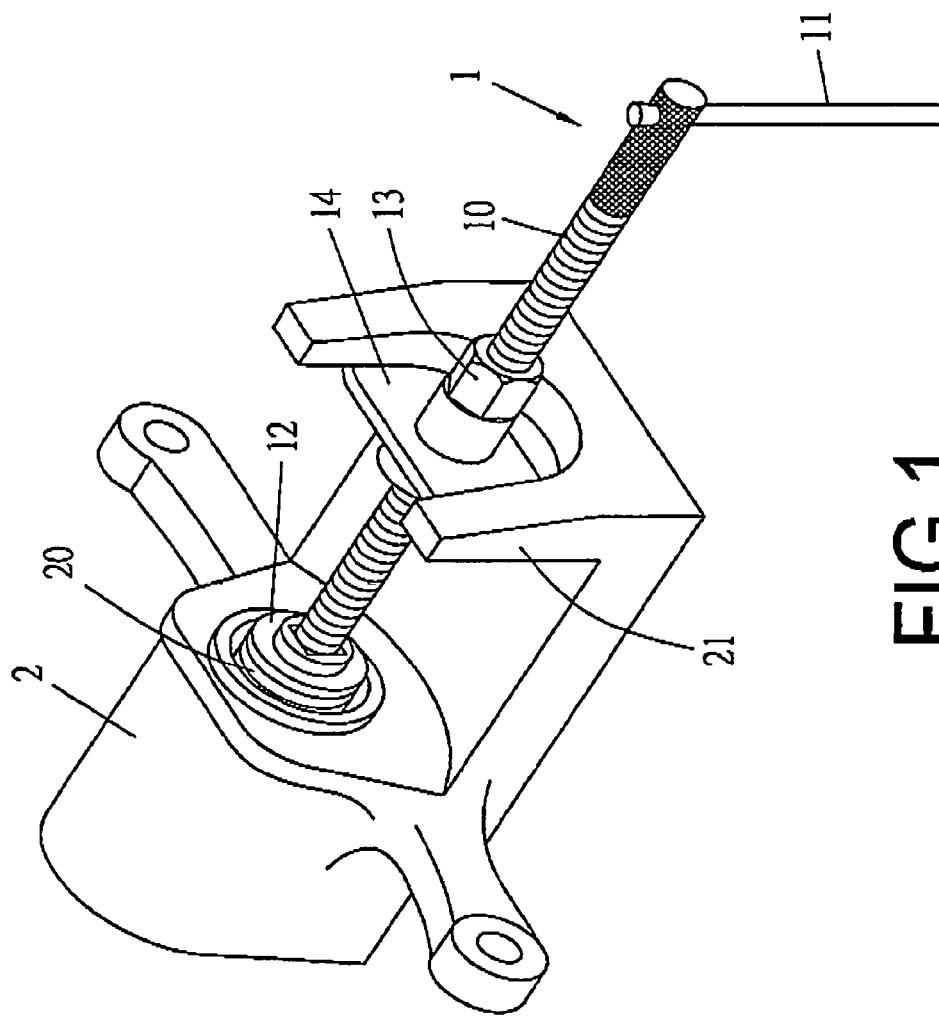
FIG. 1 illustrates the use of a conventional caliper piston adjuster.
Figure 2:
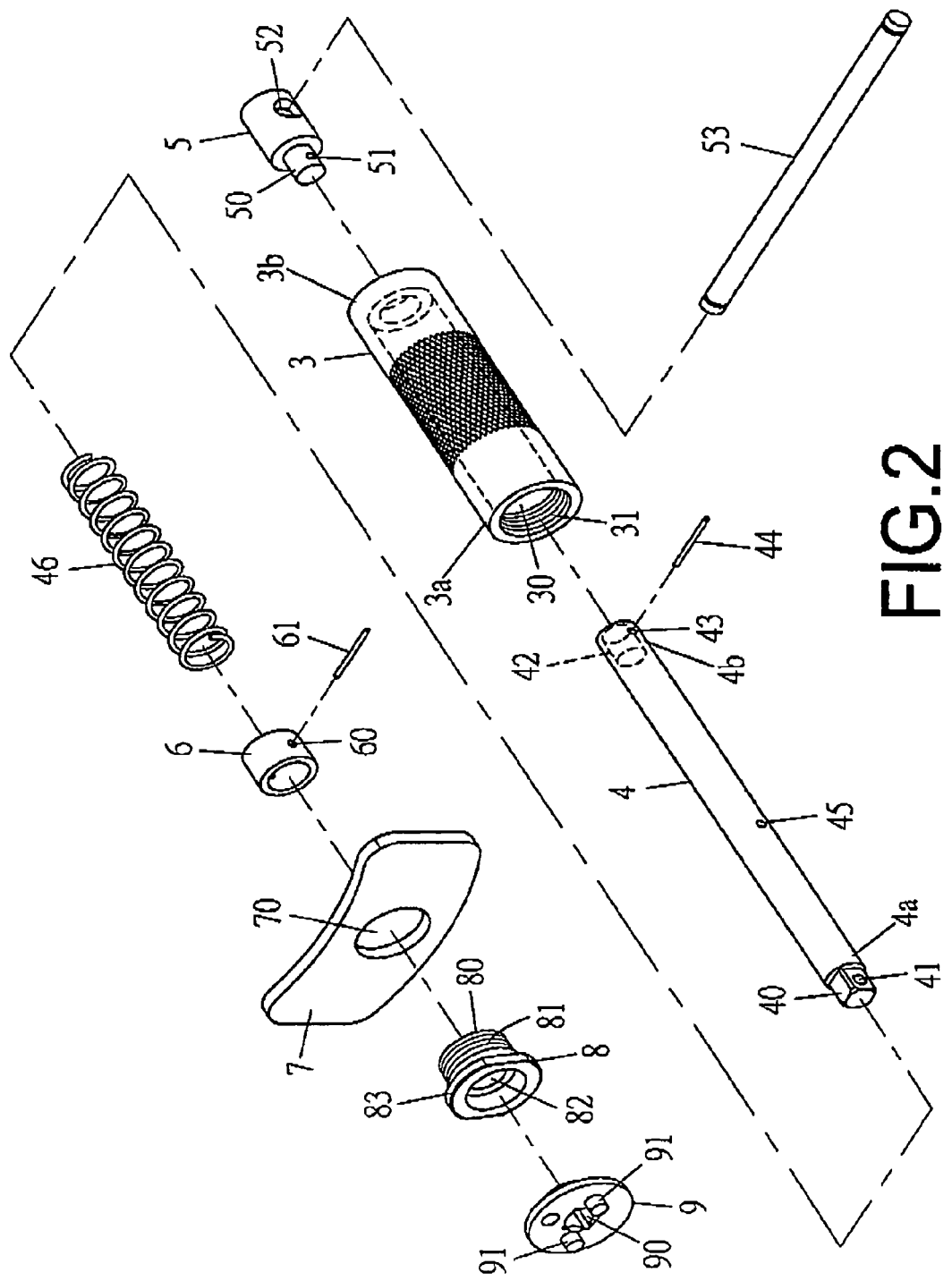
FIG. 2 is an exploded view of a caliper piston adjuster according to one embodiment of the present invention.
Figure 3:
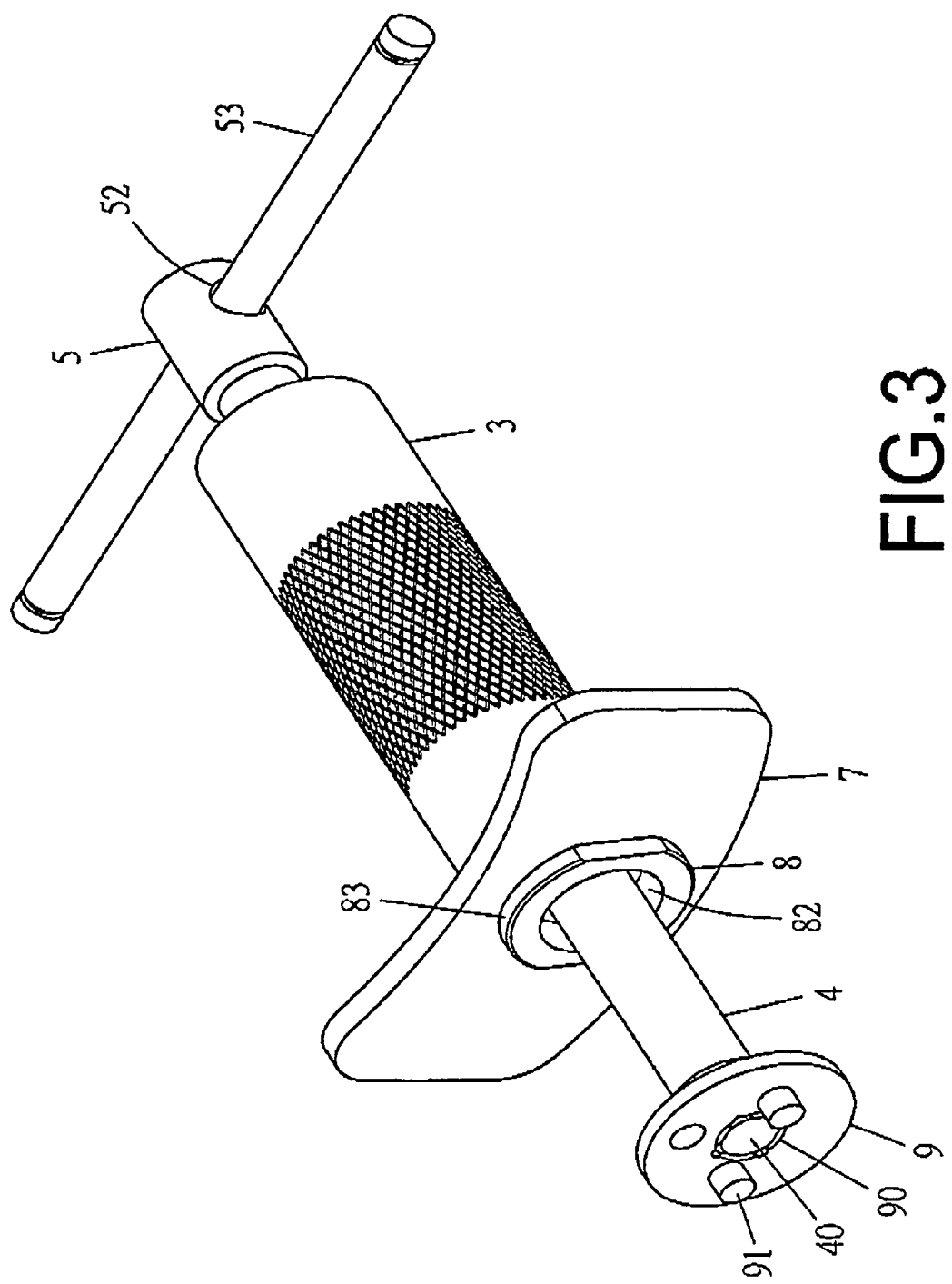
FIG. 3 is a perspective view of the caliper piston adjuster of the present invention.
Figure 4:
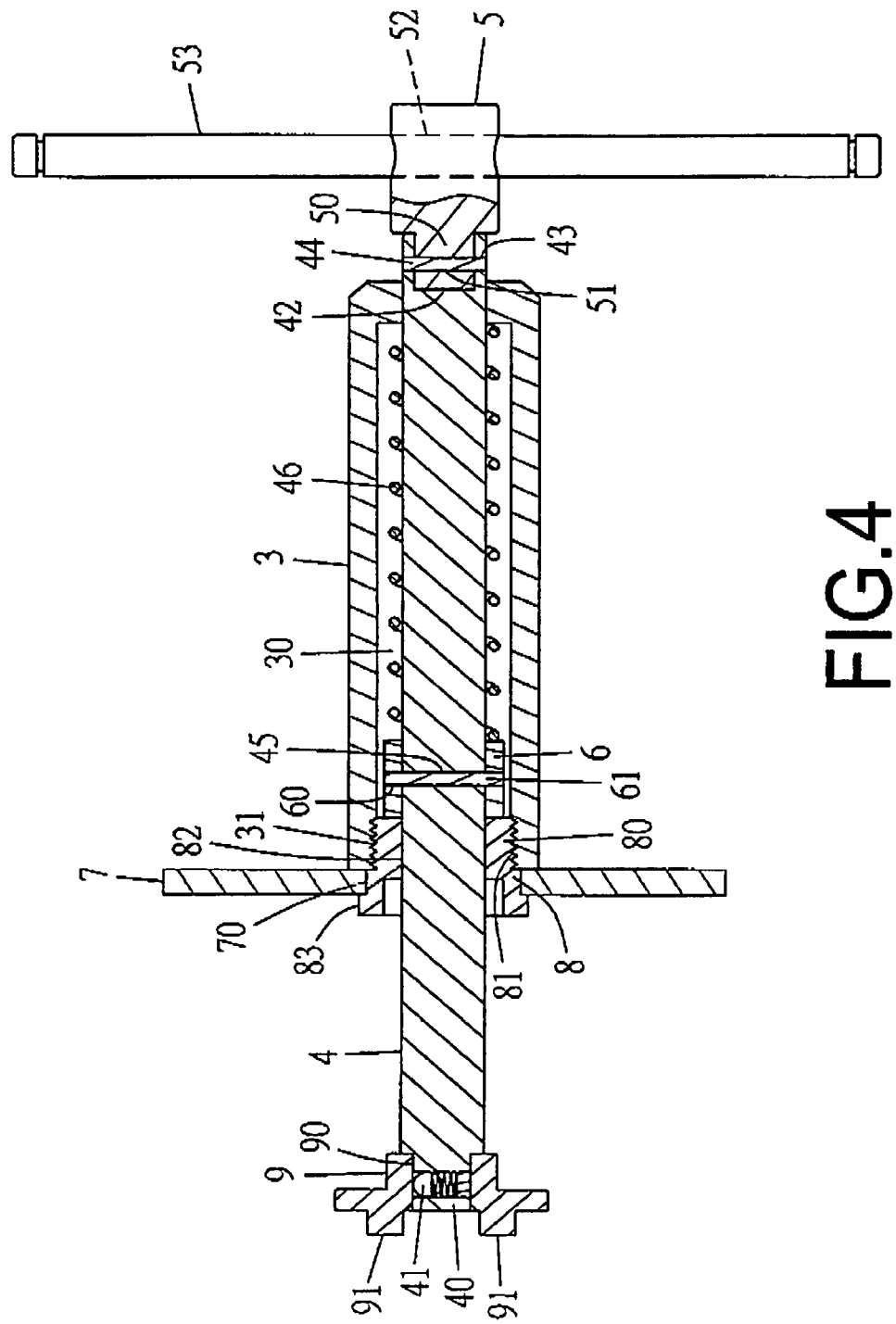
FIG. 4 is a cross sectional view of the caliper piston adjuster of the present invention.
Figure 5:
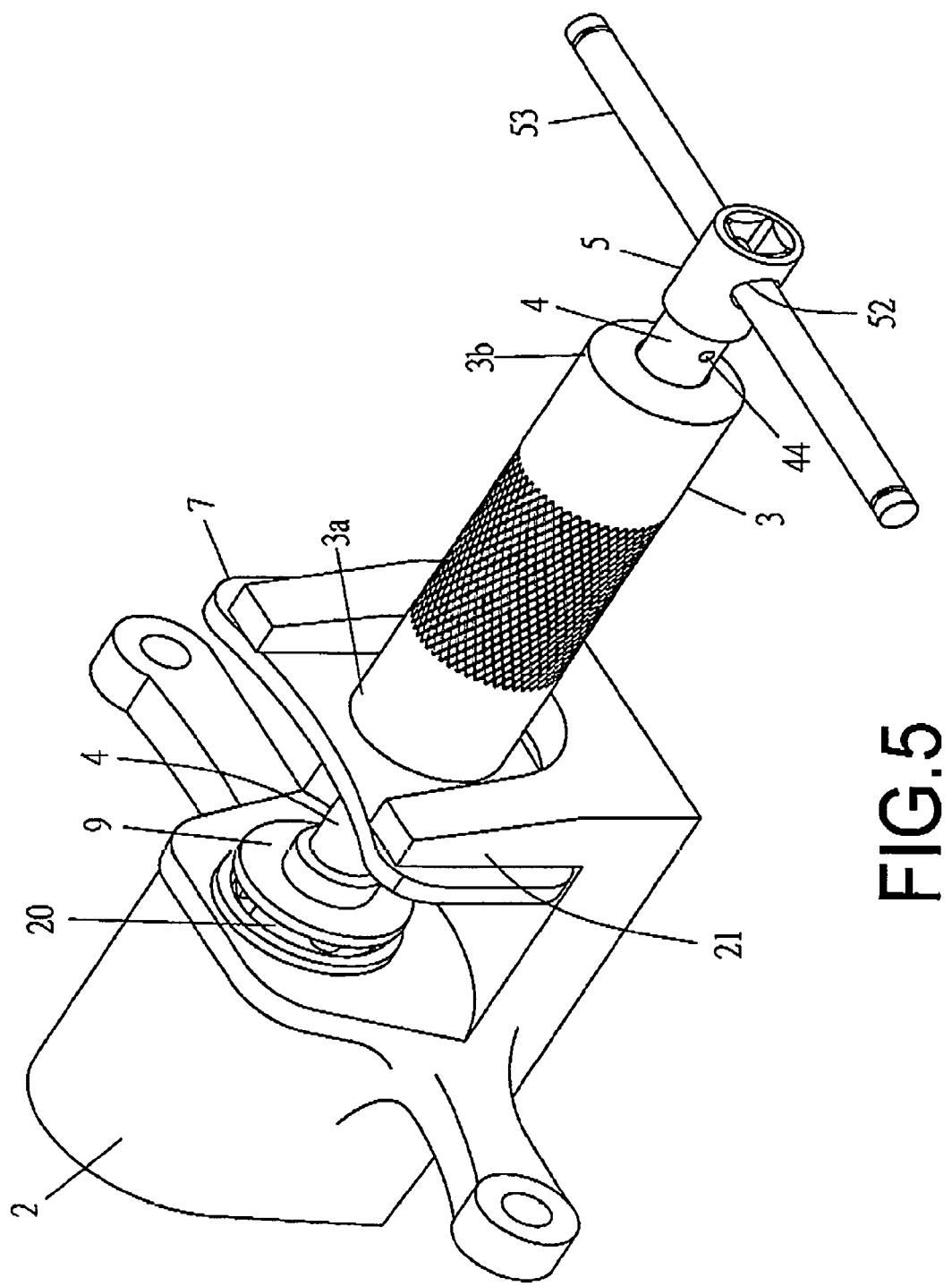
FIG. 5 illustrates the use of the caliper piston adjuster of the present invention to a caliper cylinder.
Figure 6:
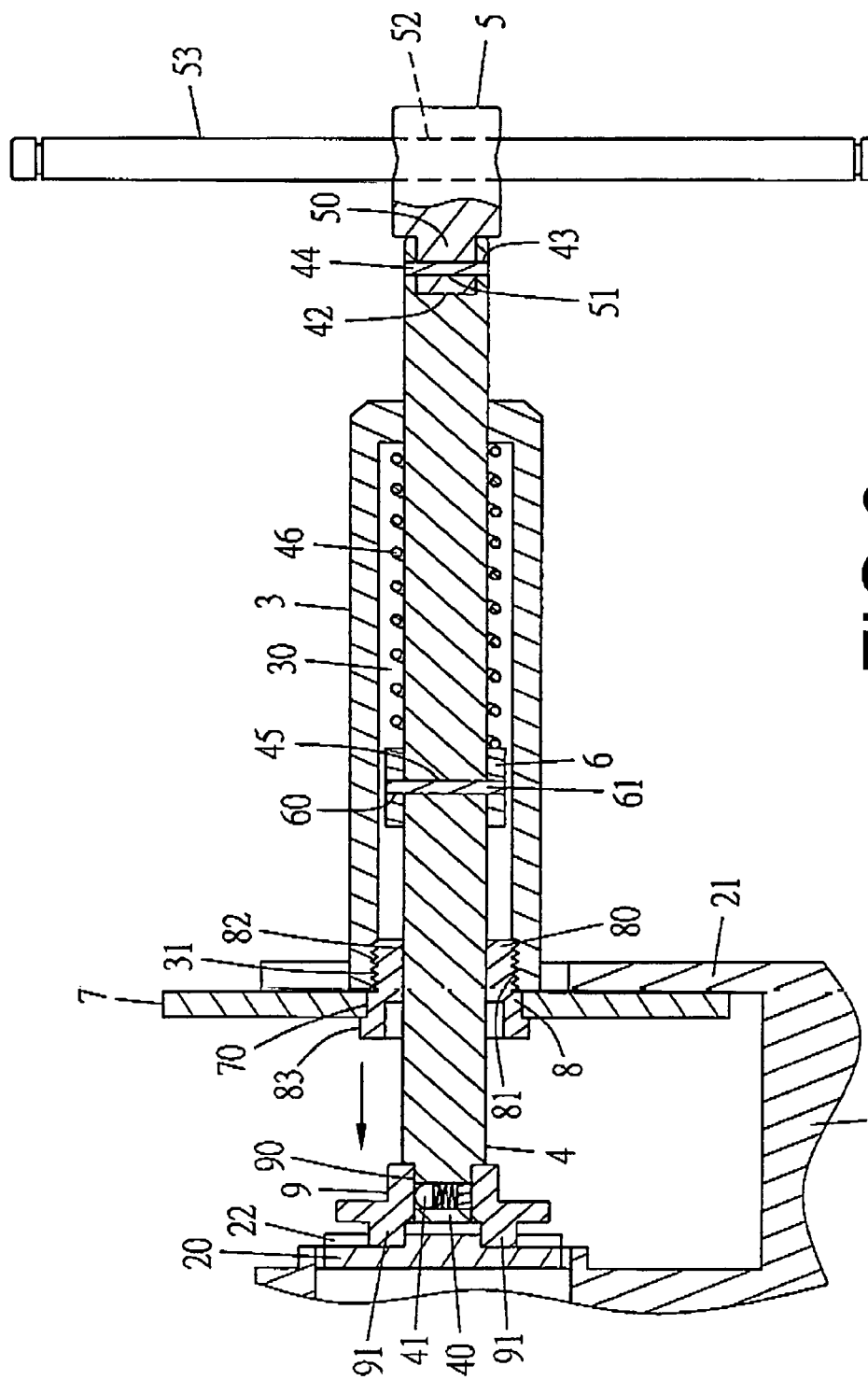
FIG. 6 is a cross sectional view of the caliper piston adjuster, demonstrating that a push rod thereof is pushing the piston of the caliper cylinder.

Referring to FIGS. 2 to 4, a caliper piston adjuster according to one embodiment of the present invention comprises a body 3 having a first end 3a, a second end 3b, and defining a passage 30 axially therethrough. Female threads 31 are defined at the inner periphery of the first end 3a of the body 3.

A push rod 4 has a first end 4a and a second end 4b and is inserted through the passage 30 of the body 3 and has a polygonal positioning protrusion 40 extending from the first end 4a thereof. A positioning ball 41 is connected to one side of the positioning protrusion 40. A recess 42 is defined at the second end 4b of the push rod 4. Two opposite first pin holes 43 are defined through the second end 4b of the push rod 4 and communicate with the recess 42, wherein the first pin holes 43 are substantially at a right angle to the recess 42. The push rod 4 has a positioning hole 45 defined transversely therethrough, between the first end 4a and the second end 4b.

A connector 5 is connected to the second end 4b of the push rod 4 and has a through hole 52 defined transversely therethrough. A holding rod 53 is inserted through the through hole 52. The connector 5 has an extension 50 extending from one end thereof. The extension 50 is inserted into the recess 42 of the push rod 4 and has a second pin hole 51 which can be aligned with the first pin holes 43 of the push rod 4. A pin 44 is inserted through the first and second pin holes 43, 51, so that the connector 5 is fixedly connected to the push rod 4.

A positioning part 6 is connected to the push rod 4, and in this embodiment, the positioning part on the push rod 4 is in the form of a collar which defines two opposite third pin holes 60. Another pin 61 is inserted through the third pin holes 60 and the positioning hole 45, so that the positioning part 6 is fixedly connected to the push rod 4.

A resilient member 46, such as a compressible coil spring, is mounted to the push rod 4, in the passage 30 of the body 3, and has one end thereof contacting the collar 6 on the push rod 4. The caliper piston adjuster further comprises a positioning stop plate 7 defining an opening 70, through which the positioning stop plate 7 can be mounted to the body 3. A positioning member 8 is connected to the first end 3a of the body 3 and has a tubular portion 80 extending therefrom. The tubular portion 80 of the positioning member 8 has male threads 81 which are threadedly engaged with female threads 31 of the first end 3a of the body 3. An axial hole 82 is defined in the positioning member 8, and the push rod 4 is inserted through the axial hole 82. The positioning member 8 has a flange 83 extending radially from one end thereof. The flange 83 is urged against the positioning stop plate 7 between the body 3 and the positioning member 8.

An activating disc 9 defines a polygonal insert hole 90, into which the positioning protrusion 40 of the push rod 4 can be inserted. The activating disc 9 has at least two studs 91 on one side thereof.

When in assembly, the collar 6 is mounted to the push rod 4, and the third pin holes 60 of the collar 6 are aligned with the positioning hole 45 of the push rod 4. The pin 61 is inserted through the third pin holes 60 of the collar 6 and the positioning hole 45 of the push rod 4 so as to connect the collar 6 to the push rod 4. The resilient member 46 is mounted to the push rod 4 which is then inserted through the passage 30 of the body 3 so that the second end 4b of the push rod 4 is forced to extend out of the second end 3b of the body 3. The resilient member 46 and the collar 6 are located in the passage 30 of the body 3. The resilient member 46 is biased between the second 3b end of the body 3 and one side of the collar 6. The extension 50 of the connector 5 is then inserted into the recess 42 of the push rod 4 to have the second pin hole 51 aligned with the first pin holes 43. The pin 44 is inserted through the first pin holes 43 and the second pin hole 51 to connect the connector 5 to the second end 4b of the push rod 4. The holding rod 53 is inserted through the through hole 52 of the connector 5, and the positioning member 8 is inserted through the opening 70 of the positioning stop plate 7. The positioning member 8 is then mounted to the body 3, wherein the male threads 81 of the tubular portion 80 of the positioning member 8 are threadedly engaged with female threads 31 of the first end of the body 3, so that the positioning member 8 and the positioning stop plate 7 are fixed to the body 3. The activating disc 9 is then connected to the positioning protrusion 40 of the push rod 4. The positioning ball 41 on the positioning protrusion 40 contacts an inner surface of the insert hole 90 of the activating disc 9 to connect the activating disc 9 to the positioning protrusion 40.

Figure 7:
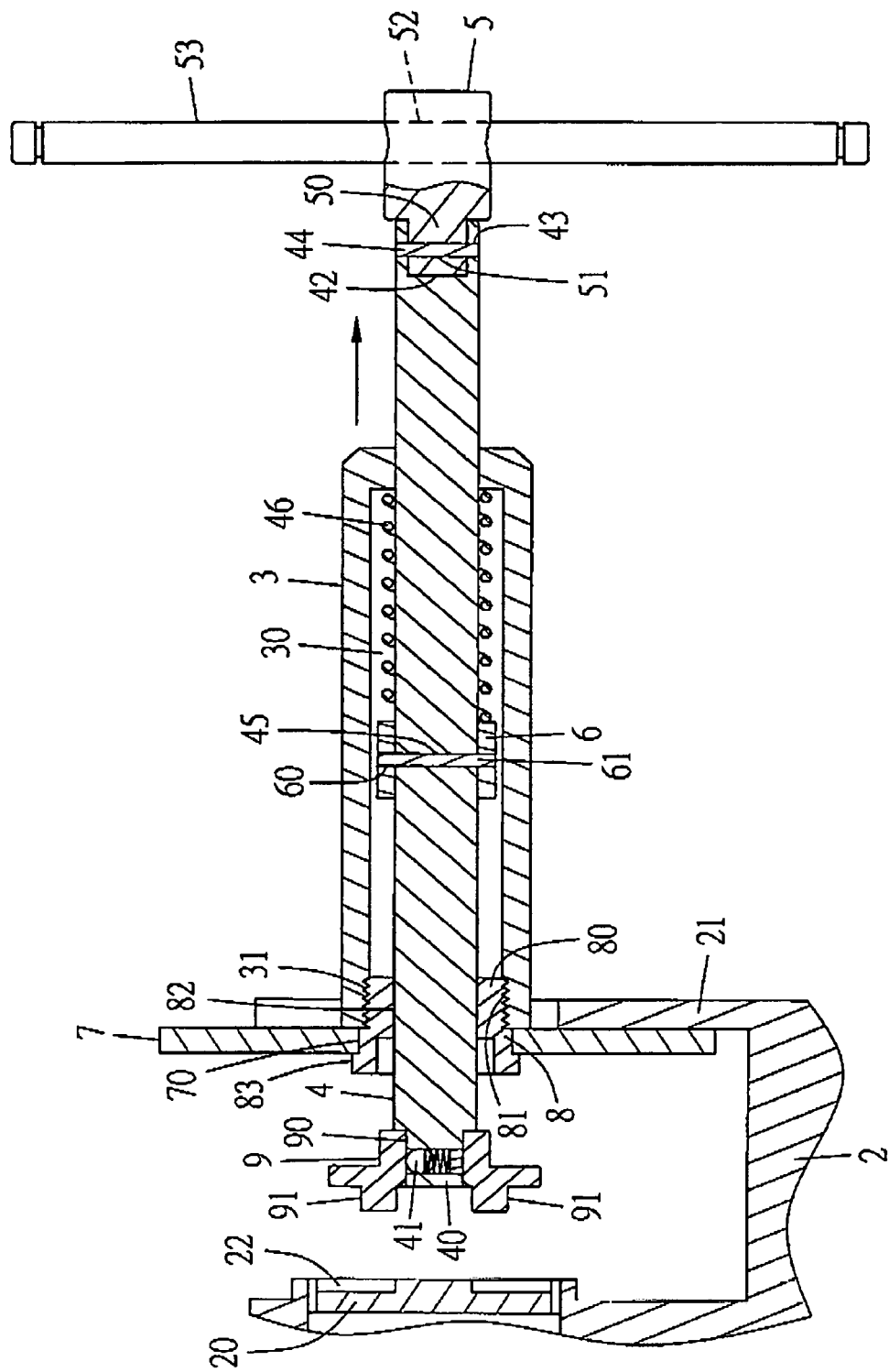
FIG. 7 is a cross sectional view of the caliper piston adjuster, demonstrating the push rod is moving backward after the piston of the caliper cylinder has been adjusted.

When adjusting a caliper cylinder 2, as shown in FIGS. 4 to 7, the caliper piston adjuster is connected to the caliper cylinder 2, and the positioning stop plate 7 is urged against the caliper body 21 of the caliper cylinder 2. The resilient member 46 pushes the collar 6 to move the push rod 4 towards the piston 20 of the caliper cylinder 2, so that the activating disc 9 on the push rod 4 is urged against the piston 20 of the caliper cylinder 2. The studs 91 of the activating disc 9 are engaged with the recesses 22 of the piston 20. The holding rod 53 rotates the push rod 4 so that the activating disc 9 rotates the piston 20 inwardly until the piston 20 is moved back to its original position. After the piston 20 is moved back to its original position, as shown in FIG. 7, the user simply holds the holding rod 53 and pulls the push rod 4 outward, causing the collar 6 on the push rod 4 to compress the resilient member 46 so that the activating disc 9 on the push rod 4 is removed from the caliper cylinder 2. When the activating disc 9 is separated from the piston 20, the body 3 can be detached from the caliper body 21 of the caliper cylinder 2. When releasing the holding rod 53, the resilient member 46 bounces back to push the push rod 4 back to its original position, thus completing the task of adjusting the caliper cylinder 2. The caliper piston adjuster of the present invention can adjust the pistons of caliper cylinders in a brake system of a vehicle, and no threaded rod is needed.

While we have shown and described the embodiment in accordance with the present invention, it should be clear to those skilled in the art that further embodiments may be made without departing from the scope of the present invention.

What is claimed is:

1. A caliper piston adjuster comprising:
a body having a first end and a second end and defining a passage therethrough;
a push rod provided at a first end thereof with a polygonal positioning protrusion, and fixedly connected with a positioning part, and mounted with a resilient member, and inserted through the passage of the body, such that one end of the resilient member contacts the positioning part fixed at the push rod, a positioning ball being connected to a side of the positioning protrusion, a connector being fixedly connected to a second end of the push rod and having a through hole defined transversely therethrough, a holding rod being inserted through the through hole of the connector; and
a positioning member connected to the first end of the body and having a tubular portion, an axial hole defined in the positioning member, the first end of the push rod being inserted through the axial hole to be fixedly connected with an activating disc, the positioning member having a flange; whereby rotation of the push rod by the holding rod, under assistance of the resilient member, allows the push rod to move forwardly so that the activating disc can push the piston of a caliper cylinder to return to its original position.

2. The caliper piston adjuster as claimed in claim 1, wherein female threads are defined at an inner periphery of the first end of the body, and the tubular portion of the positioning member has male threads which are threadedly engaged with the female threads of the first end of the body.

3. The caliper piston adjuster as claimed in claim 1, wherein the push rod defines a recess and two opposite first pin holes at its second end, the first pin holes are substantially at a right angle to the recess and communicate with the recess, the connector has an extension inserted into the recess of the push rod and defines a second pin hole which is aligned with the first pin holes of the push rod, and a pin is inserted through the first and second pin holes, so that the connector is fixedly connected to the push rod.

4. The caliper piston adjuster as claimed in claim 1, wherein the push rod has a positioning hole defined transversely therethrough, located between its first and second ends, the positioning part on the push rod is a collar which defines two opposite third pin holes, and another pin is inserted through the third pin holes and the positioning hole.

5. The caliper piston adjuster as claimed in claim 1, further comprising a positioning stop plate which defines an opening and is mounted to the body via the opening.

6. The caliper piston adjuster as claimed in claim 1, wherein the activating disc defines a polygonal insert hole and has at least two studs on one side thereof, the positioning protrusion of the push rod being inserted into the polygonal insert hole of the activating disc, so that the activating disc is fixedly connected to the push rod.

* * * * *